(No Model.)

W. J. WALSH.
APPARATUS FOR REVERSING MOTION.

No. 491,722. Patented Feb. 14, 1893.

Witnesses.
W. C. Locke.
A. F. Prentice.

Inventor.
W. J. Walsh

THE NORRIS PETERS CO., PHOTO-LITHO., WASHINGTON, D. C.

UNITED STATES PATENT OFFICE.

WILLIAM J. WALSH, OF WORCESTER, MASSACHUSETTS.

APPARATUS FOR REVERSING MOTION.

SPECIFICATION forming part of Letters Patent No. 491,722, dated February 14, 1893.

Application filed March 1, 1890. Serial No. 342,321. (No model.)

*To all whom it may concern:*

Be it known that I, WILLIAM J. WALSH, a citizen of the United States, and a resident of Worcester, in the county of Worcester and State of Massachusetts, have invented a new and useful Improvement in Apparatus for Reversing Rotary Motion, of which the following is a specification, containing a full, clear, and exact description of the same, accompanied by drawings forming part of the specification, and representing my invention as applied to a counter-shaft.

Figure 1:
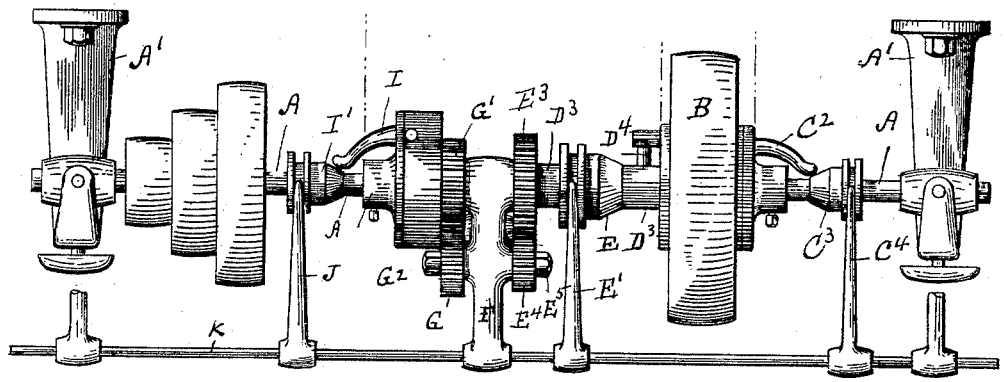
Figure 2:
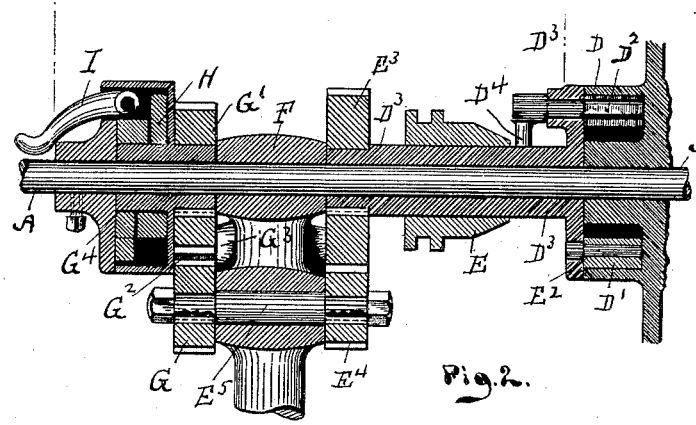
Figure 3:
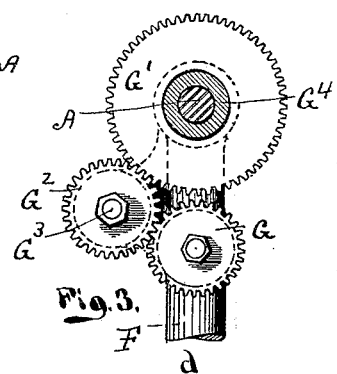
Figure 6:
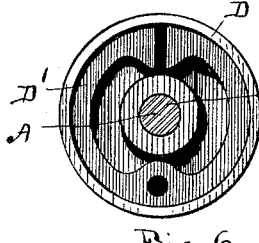
Figure 4:
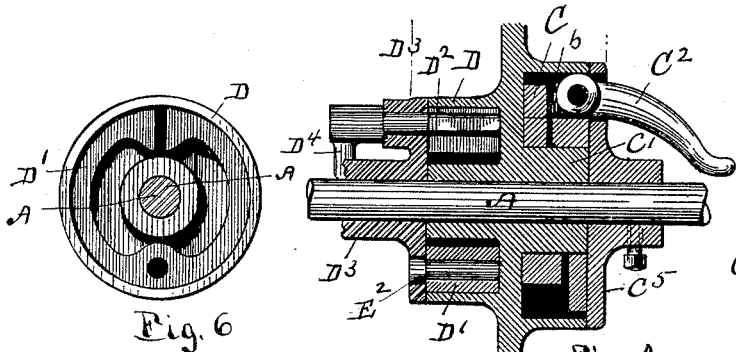
Figure 5:
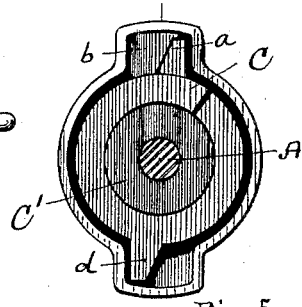
Figure 7:
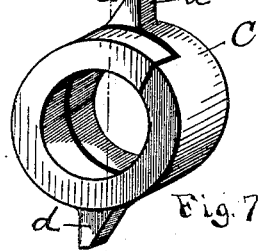

In the drawings: Figure 1 represents a counter shaft such as is usually used for driving metal turning lathes, and having an apparatus for reversing the rotary motion of the shaft applied thereto, Fig. 2 is a central longitudinal sectional view of the device for reversing the motion of the shaft and illustrates the construction and arrangement of the parts embodying my invention, Fig. 3 represents a portion of the gearing shown in elevation in Fig. 1, Fig. 4 is a central longitudinal sectional view of the clutching mechanism shown partly in sectional view in Fig. 2, Fig. 5 is an end view of the clutching mechanism represented in sectional view in Fig. 4, but with the cap removed in order to clearly disclose the elastic friction ring, Fig. 6 is a view of the interior of the shell or case, which incloses the expanding elastic ring through which the motion of the shaft is reversed, and Fig. 7 is a perspective view of the elastic friction ring represented in end view in Fig. 5.

Similar letters refer to similar parts in the different figures.

My invention relates to an apparatus designed to be interposed between a shaft and the driving power by which the shaft is rotated, whereby the rotary motion of the shaft is reversed without changing the direction of the driving power. In the countershafts employed in driving metal turning lathes it is desirable to reverse the rotary motion of the lathe in the operation of screw-cutting, and my invention is, therefore, adapted to use in driving the counter shafts of such lathes.

Referring to the drawings, A, denotes the counter shaft, journaled in the hangers A' A'.

B denotes the belt pulley to which a rotary motion in one direction is imparted from a main driving shaft.

Between the belt pulley B and the shaft A, is placed a friction clutch of any of the ordinary and well known forms of construction, by which the rotary motion of the pulley B can be communicated at will to the shaft A causing the shaft A to rotate in the same direction as the pulley B. Such a friction device is represented in sectional view in Fig. 4 of the drawings, in which C denotes an elastic friction ring inclosing the hub C' of the pulley B and which is compressed on the hub C' by the angular movement of the pivoted lever C² as it is actuated by the sliding cone C³ which is moved along the shaft A by means of the shipper fork C⁴, the rotary motion of the pulley is thereby communicated through the friction ring C cap C⁵ to the shaft A in the manner common in friction devices of this class and well understood, without detailed description. Upon the opposite side of the pulley B is a flange D, within which is placed an expansion friction ring, D' between the ends of which is placed a rotating blade D² journaled in a collar or sleeve D³ turning upon the shaft A. The outer end of the rotating blade D² is provided with an arm D⁴, beneath which the sliding cone E is moved by the shipper fork E', causing the blade D² to be rotated, spreading the ends of the friction ring apart and crowding it against the inside of the flange D. The friction ring D' is attached to the sleeve D³ by a driving pin E² so that the rotary motion of the pulley B and ring D' is communicated to the sleeve D³. Upon the opposite end of the sleeve D³ is attached the spur gear E³, which engages a spur pinion E⁴ upon the intermediate shaft E⁵, journaled in the arm F, and carrying the spur gear G, which drives the spur gear G' through the intermediate gear G² turning loosely upon a stud G³ held in the arm F, thereby reversing the rotary motion of the gear G', which is attached to the hub G⁴. A friction ring H is compressed upon the hub G⁴ in the same manner as already described with reference to the ring C, whereby the reversed rotary motion of the hub G⁴ is communicated to the shaft A. The friction ring H is compressed by the action of the lever I, actuated by the sliding cone I' moved along the shaft A by the shipper fork J. The shipper forks J, E' and C⁴ are connected with a common sliding shipper rod K, so that a simultaneous movement is imparted to all the sliding cones I', E and C³ and in the same direction.

In the position of the three sliding cones as represented in Fig. 1 of the drawings none of the levers I, D⁴ or C² are shown as moved by their respective cones, but in case the shipper rod K is moved to the left the cone C³ is brought under the lever C² and the friction device actuated by the lever C² serves to connect the rotating pulley B with the shaft A, driving the shaft in the same direction as the pulley is turning. By moving the shipper rod K from the position in which it is shown in Fig. 1 toward the right the cone E is brought beneath the lever D⁴, rocking the blade D² and expanding the ring D', causing the rotary motion of the pulley B to be communicated to the sleeve D³ and also to the train of gearing, imparting a reverse motion to the hub G⁴, at the same time the cone I' is brought beneath the lever I serving to compress the friction ring H upon the hub G⁴ and cause the reverse motion to be imparted to the shaft A.

The construction of the several friction devices forms no part of my invention as it will be obvious that any of the known forms of friction mechanisms can be used whereby the rotary motion of a revolving pulley is imparted to the shaft upon which the pulley is placed.

What I claim as my invention and desire to secure by Letters Patent is:—

1. The combination with a shaft and a pulley revolving on said shaft, of a friction device by which said pulley can be connected with the shaft, a sleeve turning loosely on the shaft, a friction device by which said pulley is connected with said sleeve, a gear attached to said sleeve, a gear turning loosely on said shaft, intermediate gearing by which the gear upon said sleeve is made to turn the gear on the shaft with a motion reverse to the motion of the pulley and a friction device whereby the rotary motion of said gear upon the shaft is imparted to the shaft, substantially as described.

2. The combination with a shaft, of a pulley B, clutching devices by which the pulley and shaft are connected, sleeve D³, clutching devices by which said sleeve and the pulley are united, gear G³, gear G', intermediate gears E⁴, G, and G² carried by an arm F, arm F, clutching devices by which the gear G' and the shaft are connected, shipping rod K and forks carried by said rod, whereby the clutching devices are simultaneously operated, substantially as described.

Dated February 22, 1890.

WILLIAM J. WALSH.

Witnesses:
RUFUS B. FOWLER,
H. M. FOWLER.